Dec. 14, 1937.   E. W. VESSEY   2,101,882
WAGON
Filed March 6, 1936

INVENTOR.
ELTON W. VESSEY
BY Lincoln Johnson
ATTORNEY.

Patented Dec. 14, 1937

2,101,882

UNITED STATES PATENT OFFICE 2,101,882

WAGON

Elton W. Vessey, Pasadena, Calif.

Application March 6, 1936, Serial No. 67,561

2 Claims. (Cl. 214—82)

This invention relates particularly to a wagon or vehicle for transporting vegetables in bulk such as lettuce, potatoes and the like, from the fields in which said vegetables are grown to a packing plant where said vegetables may be crated or otherwise packaged for market purposes.

An object of the invention is to provide a relatively light weight, sturdy and durable wagon having a relatively low body or bed, whereby vegetables may be easily placed thereon, the said body of the vehicle having a movable element thereon which is adapted to be moved transversely of the said body to automatically dump the vegetables from one side of the said wagon.

Other objects of the invention are to provide a wagon or vehicle for transporting vegetables that will be superior in point of simplicity, inexpensiveness of construction, positiveness of operation, and facility and convenience in use and general efficiency.

In this specification and the annexed drawing, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

Figure 1:
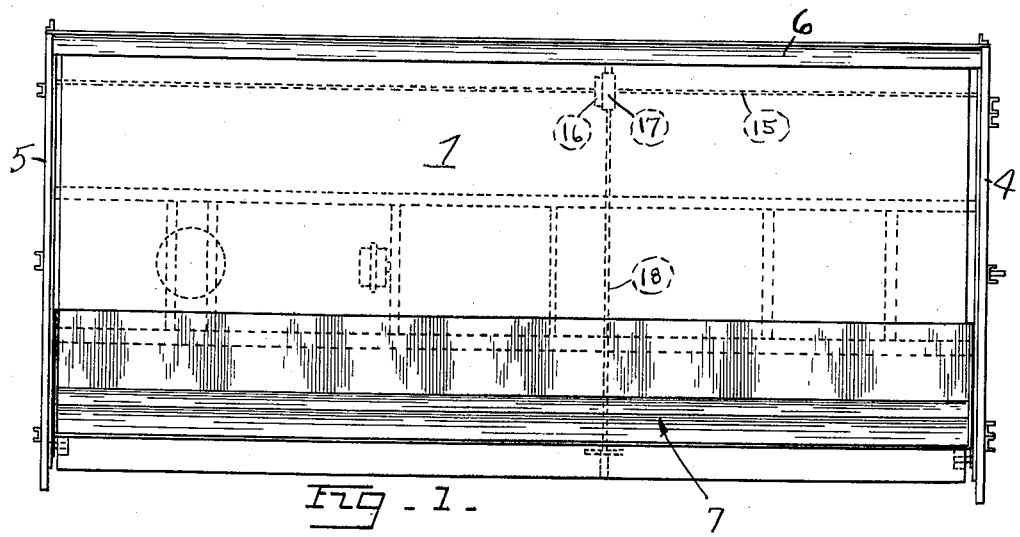
Fig. 1 is a plan view of a wagon constructed in accordance with my invention.
Figure 2:
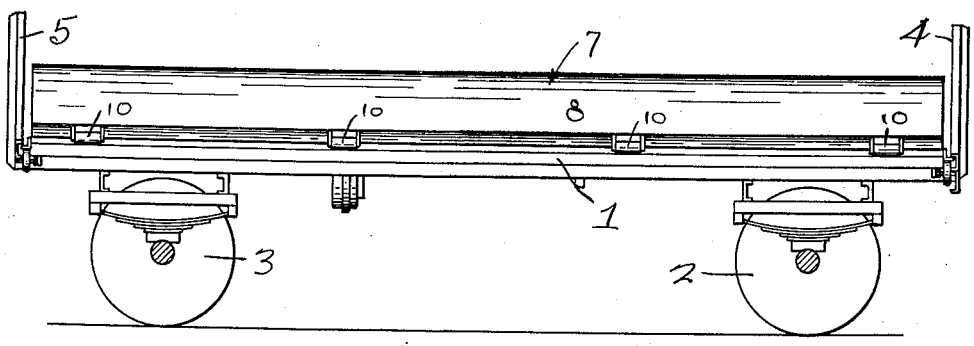
Fig. 2 is a side elevation of Fig. 1.
Figure 3:
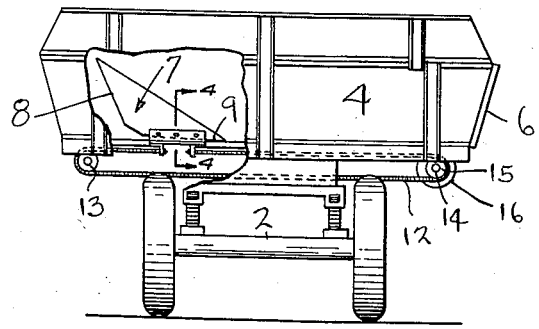
Fig. 3 is an end elevation of Fig. 2, partly broken away to show the interior construction thereof.
Figure 4:
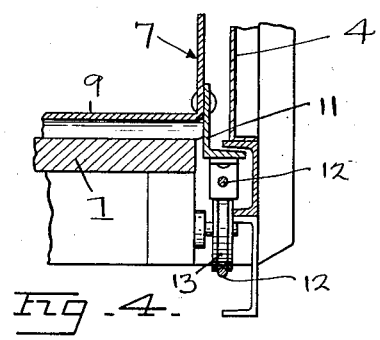
Fig. 4 is an enlarged cross section taken through Fig. 3 on the line 4—4.

The present invention is a modification of the form of wagon shown in applicant's Patent 2,045,149.

In detail the construction illustrated in the drawing comprises a mobile vehicle or wagon consisting of a low bed chassis 1, at the front and rear ends of which on the under side thereof, are provided the respective trucks 2 and 3, each of which consists of the usual road wheels, axle, springs and mounting, secured to the under side of the chassis 1. The front truck of the vehicle is provided with a fifth wheel or other equivalent member, to permit of steering of the said vehicle.

The gauge of the road wheels may be any selected distance most conducive to efficient operation with the particular vegetables to be carried by the wagon during the harvesting operation.

The vehicle is provided with a tow bar (not shown) connected to the front truck for the purpose of drawing said vehicle and for steering it in any desired direction.

The opposite ends of the chassis are provided with permanent end boards 4 and 5, and along one side of the chassis there is provided a hinged drop side 6. The bottom of the chassis or bed 1 has a relatively smooth surface and on it I have arranged a movable side member 7 which extends lengthwise of the bed 1, between the end boards 4 and 5. The movable side member 7 is adapted to be moved transversely of the vehicle from one side thereof toward the opposite side on which the hinged side board 6 is mounted.

At the commencement of the harvesting operation, the movable member 7 would be arranged along the uncovered side of the chassis 1 so that said member would function as a side board for the wagon. The movable member 7 is bent into two planes, the plane 8 thereof lying in the approximate vertical position, and the connected bottom plane 9 lies directly upon the upper face of the bed of the chassis 1. The bottom plane 9 of the member 7 is disposed at a slight angle to the bed of the chassis so that the leading edge thereof will contact the wagon bottom, sufficient space being provided at the rear end of said plane 9 for the arrangement of rollers 10 therein, upon which said movable member rests to facilitate movement of said member transversely of the chassis. The opposite ends of the movable member 7 are provided with depending brackets 11 thereon, each of which is attached to a cable or chain 12 arranged transversely of the vehicle, at each of its opposite ends.

Each cable or chain 12 passes around pulleys 13 and 14 mounted on opposite sides of the vehicle. The pulleys 14 are fixedly mounted on a shaft 15 which extends lengthwise of the chassis beneath the bottom face thereof. A worm wheel 16 is mounted on the shaft 15 and a worm 17 meshes with said worm wheel 16. The worm 17 is provided with a shaft 18 extended axially therefrom, which shaft 18 is adapted to be rotated either manually or mechanically thereby rotating the shaft 15 and belts 12 to initiate transverse movement of the member 7 in either direction upon the chassis 1. The worm 17 and worm wheel 16 function as reduction gears and thereby reduces the power or friction necessary to move the member 7 across the body of the wagon.

Having thus described this invention, what I claim and desire to secure by Leters Patent is:

1. A mobile vehicle to be used in the harvesting of vegetables comprising a body including a floor and having road wheels thereon, fixed upright members on the opposite upper ends of said body; a member arranged longitudinally of the body along one of the upper sides thereof forming at times a side member for said body and at other times serving to move the contents of the vehicle in a transverse direction toward the other side of said body to permit progressive unloading of the vehicle from the open side thereof without interfering with the forward movement of the vehicle; means on the vehicle to move the movable side member transversely of the body; and rollers arranged longitudinally of said movable member and resting upon the floor of the body to facilitate the movement of said member in a transverse direction.

2. A mobile vehicle to be used in the harvesting of vegetables comprising a body including a floor and having road wheels thereon, fixed upright members on the opposite upper ends of said body; a member arranged longitudinally of the body along one of the upper sides thereof forming at times a side member for said body and at other times serving to move the contents of the vehicle in a transverse direction toward the other side of said body to permit progressive unloading of the vehicle from the open side thereof without interfering with the forward movemnt of the vehicle; rollers arranged longitudinally of said movable member and resting upon the floor of the body to facilitate the movement of said member in a transverse direction; arms depending from the opposite ends of said member and extending below the floor of said body; and endless belts arranged at opposite ends of said body and connected to said depending arms to move the movable side member transversely of the body.

ELTON W. VESSEY.